United States Patent [19]

Ikawa

[11] Patent Number: 5,073,774
[45] Date of Patent: Dec. 17, 1991

[54] ONE-TO-ONE SWITCHING SYSTEM

[75] Inventor: Fumihiro Ikawa, Yokohama, Japan

[73] Assignee: Fujitsu Limited, Kawasaki, Japan

[21] Appl. No.: 637,991

[22] Filed: Jan. 3, 1991

Related U.S. Application Data

[63] Continuation of Ser. No. 314,121, Feb. 23, 1989, abandoned.

[30] Foreign Application Priority Data

Feb. 23, 1988 [JP] Japan .................. 63-40076

[51] Int. Cl.$^5$ .................. H04Q 9/00; G06F 11/00
[52] U.S. Cl. .................. 340/825.160; 340/827; 340/825.03; 379/2; 371/8.1
[58] Field of Search .................. 340/825.160, 825.01, 340/825.03, 827; 370/16; 379/2; 371/8.1, 8.2

[56] References Cited

U.S. PATENT DOCUMENTS

| | | | |
|---|---|---|---|
| 3,305,791 | 2/1967 | Wolfe et al. | 371/8.1 |
| 3,451,042 | 6/1969 | Jensen et al. | 371/8.2 |
| 4,030,069 | 6/1977 | Herickson et al. | 371/8.2 |
| 4,365,247 | 12/1982 | Bargeton et al. | 340/825.01 |
| 4,835,773 | 5/1989 | Kuwahara et al. | 371/8.1 |
| 4,939,736 | 7/1990 | Kocan | 371/8.1 |

Primary Examiner—Donald J. Yusko
Assistant Examiner—Peter Weissman
Attorney, Agent, or Firm—Staas & Halsey

[57] ABSTRACT

A one-to-one line switching system for switching between a hot line and a standby line in a one-to-one correspondence. To enable removal of a switching unit while in use, from a mother board for change over or repair, a pair of switching units (1 and 2 or 3 and 4) is provided at the transmitting part and at the receiving part, respectively, the earth element in one of the pair being connected to the other of the pair and the other of the pair being pulled up by a voltage, whereby, when one of the pair in use is removed, the other of the pair can pass the input signal.

10 Claims, 5 Drawing Sheets

ONE-TO-ONE SWITCHING SYSTEM

This application is a continuation of application No. 07/314,121, filed Feb. 23, 1989, now abandoned.

BACKGROUND

1. Filed of the Invention

The present invention relates to an improvement of a one-to-one line switching system having a transmitting part and a receiving part, each part having one-to-one line switching equipment for switching between hot lines and standby lines in a one-to-one correspondence, and a switch control part for controlling the switching.

A signal input to the transmitting part is distributed by the one-to-one line switching equipment and transferred to a hot line or a standby line, and the transferred signal is received by the one-to-one line switching equipment at the receiving part.

In such a system, it is sometimes necessary to change over a unit in the one-to-one line switching equipment even during use.

2. Description of the Related Art

Conventionally, the distribution of the input signal at the transmitting part is carried out by using a relay contact or a hybrid circuit in the one-to-one line switching equipment, and at the receiving part, the signal transferred from the transmitting part is received through a relay contact in the one-to-one line switching equipment at the receiving part by selectively switching the relay contact to the hot line side or to the standby line side. The unit, such as the hybrid circuit or the relay contact, is formed on a printed circuit board (PCB) which is removably attached to a mother board on which the corresponding transmitting part or receiving part is formed. The removal of the PCB is often necessary when a fault occurs in the transmitting part or in the receiving part, and the faulty PCB or the relay contact must be replaced by a new board or contact.

Since, however, the hybrid circuit or the relay contact is connected to both the hot line and the standby line, the hybrid circuit or the relay contact cannot be actually removed from the mother board when the system is in use.

Therefore, in the conventional system, the removal and the change over of the hybrid circuit or the relay contact must be carried out while the system is not in use, and this is usually at a very inconvenient time, and thus the maintenance becomes cumbersome and expensive.

SUMMARY OF THE INVENTION

Accordingly, an object of the present invention is to provide a one-to-one line switching system in which a switching unit can be removed from a mother board even while the system is in use.

To attain the above object according to the present invention, there is provided a one-to-one line switching system including a transmitting part formed on a first mother board and a receiving part formed on a second mother board.

The transmitting part comprises a first pair of switching units. Both units are flexibly removable from the first mother board, and both correspond to each other in a one-to-one correspondence. Both units have input ends operatively and commonly receiving an input signal when the first pair of switching units is plugged into the first mother board. And both units have outputs operatively connected to a hot line and to a standby line, respectively.

Each of the first pair of the switching units comprises a first switching means having an input operatively receiving, when the switching unit under consideration is plugged in, the input signal, and further having an output connected to the hot line or to the standby line. A first switching-unit removed state detecting means is operatively connected to the other of the first pair of the switching units when the first pair of the switching units is plugged in, and is operatively connected to the first switching means in the switching unit under consideration, for detecting whether the other of the first pair of the switching units has been removed from the mother board.

When one of the first pair of switching units is removed from the first mother board, the first switching-unit removed state detecting means in the other of the first pair of the switching units drives the first switching means in the other of the first switching units to pass the input signal to the output of the first switching means.

According to an aspect of the present invention, the switching system further comprises a first pair of line terminal equipment units, or devices, operatively connected to the outputs of the first switching means in the first pair of switching units, for supervising the status of the first pair of switching units, respectively; and a first switch control means, operatively connected to the first pair of line terminals and to the first switching-unit removed state detecting means in the first pair of switching units, for selectively outputting the input signal from either of the first switching units to the hot line or to the standby line, in response to the status of the first pair of switching units.

The first switching-unit removed state detecting means drives the first switching means prior to the drive thereof by the first switch control means.

According to another aspect of the present invention, in each of the first switching units, the first switching-unit removed state detecting means comprises a first switch drive means having an output operatively connected to a control terminal of the switching means in the one of the first pair of switching units under consideration a first voltage source having an output operatively connected to a control terminal of the switch drive means in one of the first pair of the switching units under consideration for providing a first voltage sufficient to drive the switch drive means in one of the first pair of switching units under consideration, and a second voltage source for providing a second voltage sufficient to inhibit the operation of the switch drive means in the other of the first pair of switching units.

When both of the first pair of switching units are plugged in, the second voltage source in one of the first pair of switching units is connected to the first voltage source in the other of the first pair of switching units, so that the second voltage is applied from the second voltage source in the other of the first pair of switching units to the first drive means in one of the first pair of switching units, causing the first switching means in one of the first pair of switching units to transmit the input signal to the output of the switching means, and causing the first switching means in the other of the first pair of the switching units to be open, and when one of the first pair of the switching units is remove from the first mother board, the second voltage source in the one of the first pair is disconnected from the first switch driving means in the other of the first pair so that, in the other of the first pair, the first voltage is applied from the first voltage source to the first driving means, causing the first switching means to transmit the input signal to the output thereof.

The receiving part comprises a second pair of switching units, both of which are flexibly removable from the second mother board, and correspond to each other in a one-to-one correspondence. Both have input ends operatively connected to the hot line and to the standby line, respectively, and both have output ends operatively and commonly connected to an output line of the one-to-one line switching system when the second pair of switching units are plugged into the second mother board.

Each of the second pair of switching units comprises a second switching means having an input operatively receiving a signal from the hot line or the standby line when the second switching unit is plugged in, and having an output connected to the output line, and a second switching-unit removed state detecting means, operatively connected to the other of the second pair of switching units when the second pair of switching units are plugged in and operatively connected to the switching means in the own switching unit, for detecting whether the other of the second pair of switching units has been removed from the second mother board. When one of the second pair of switching units is removed from the second mother board, the second switching unit removed state detecting means in the other of the second pair of switching units drives the second switching means to pass the signal from the hot line or from the standby line to the output line.

According to still another aspect of the present invention, the system further comprises a second pair of line terminals operatively connected to the inputs of the second switching means in the second pair of switching units, for supervising the status thereof, respectively, and second switch control means, operatively connected to the second pair of the line terminals and to the second switching unit removed state detecting means in the second pair of switching units, for selectively outputting the output signal from either of the second pair of switching units to the output line, in response to the status of the second pair of switching units.

The second switching unit removed state detecting means drives the second switching means prior to the drive thereof by the second switch control means.

According to still another aspect of the present invention, the second switching unit removed state detecting means in each of the second pair of switching units comprises a second switch drive means having an output operatively connected to a control terminal of the second switching means, a third voltage source having an output operatively connected to a control terminal of the second switch drive means for providing a third voltage sufficient to drive the second switch drive means in one of the second pair of switching units, and a fourth voltage source for providing a fourth voltage sufficient to inhibit the operation of the second switch drive means in the other of the second pair of switching units. When both of the second pair of switching units are plugged in, the fourth voltage source in one of the second pair of switching units is connected to the third voltage source in the other of the second pair of switching units, so that the fourth voltage is applied from the fourth voltage source in the other of the second pair of switching units to the second drive means in one of the pair of switching units, causing the second switching means in one of the second pair of switching units to transmit the signal from the hot line or the standby line to the output line, and causing the second switching means in the other of the second pair of switching units to be open. When one of the pair of switching units is removed from the second mother board, the fourth voltage source in one of the pair is disconnected from the second switch drive means in the other of the pair so that, in the other of the pair, the third voltage is applied from the third voltage source to the second drive means, causing the second switching means to transmit the signal form the hot line or the standby line to the output line.

The first switch control means comprises a switching signal transmitting means for transmitting a switching signal to the second switch control means when either of the first pair of switching units is removed from the first mother board.

The second switch control means comprises a switching signal transmitting means for transmitting a switching signal to the first switch control means when either of the second pair of switching units is removed from the second mother board.

The first switch control means drives the corresponding one of the first switch drive means when the switching signal received from the second switch control means indicates that either of the second pair of switching units has been removed form the second mother board, to drive the corresponding one of the first switching means.

The first switch control means drives the corresponding one of the first switch drive means when the switching signal received from the second switch control means indicates that either of the second pair of switching units has been removed from the second mother board, to drive the corresponding one of the second switching means.

The first voltage is a pull up voltage for driving the first switch drive means and the second voltage is a ground voltage for inhibiting the operation of the first switch drive means. The third voltage is a pull up voltage for driving the second switch drive means and the fourth voltage is a ground voltage for inhibiting the operation of the second switch drive means.

Therefore, even when the hot line is in use, a signal having a lower priority can be transmitted through the standby line.

DESCRIPTION OF THE PREFERRED EMBODIMENTS

For a better understanding of the present invention, a conventional one-to-one line switching system will be first described with reference to FIG. 1.

Figure 1:
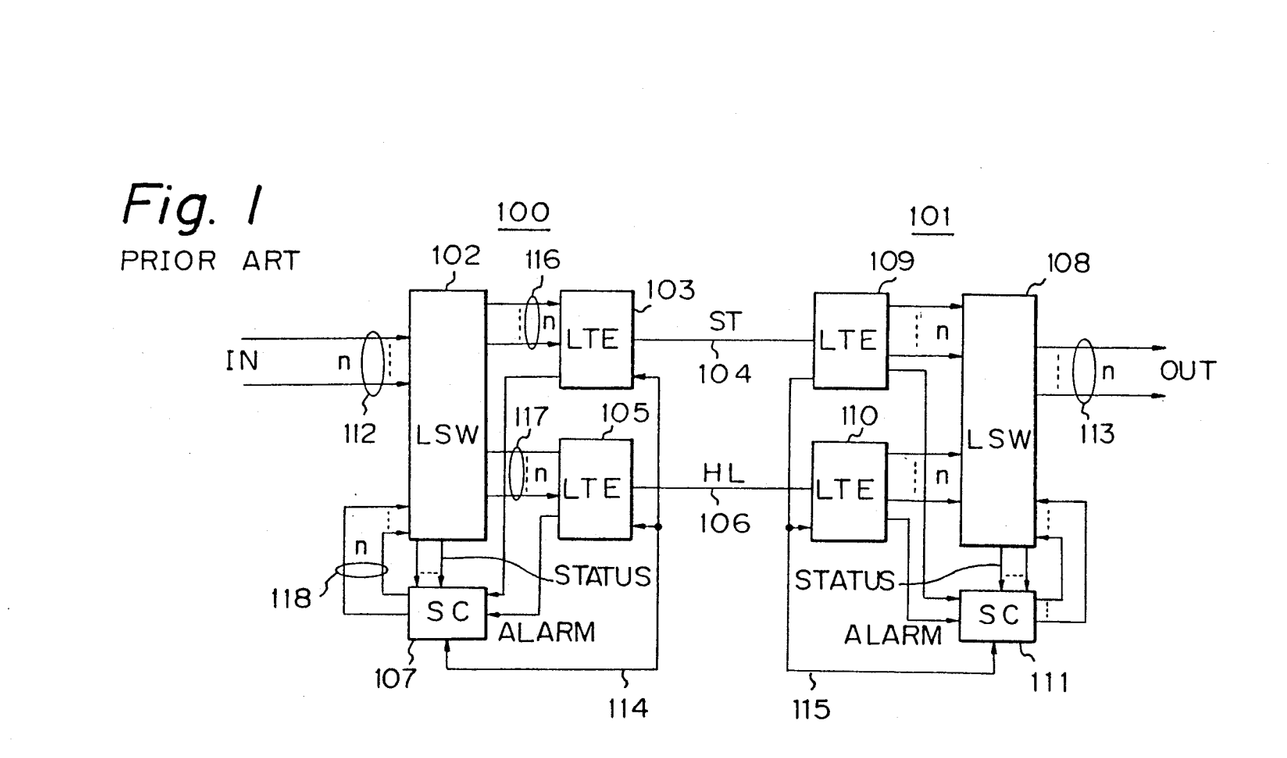
FIG. 1 is a block diagram illustrating a main portion of a conventional one-to-one line switching system, for explaining the background of the present invention.

In FIG. 1, the conventional one-to-one line switching system is constructed by a transmitting part 100 and a receiving part 101. The transmitting part 100 includes one-to-one line switching equipment ("LSW") 102 for distributing input signals received through n channel input lines ("IN") to n channel output ("OUT") 116 at a standby side or to n channel output lines 117 at a hot side, respectively connected to line terminal equipment (LTE), or line repeater equipment, hereinafter also referred to as a line terminal equipment 103 connected between the n channel output lines 116 and a standby line ("ST") 104, and line terminal equipment ("LTE") 105 connected between the n channel output lines 117 and a hot line ("HC") 106, and to a switch control circuit ("SC") 107. Similarly, the receiving part 101 includes one-to-one line switching equipment ("LSW") 108, line terminal equipment ("LTE") 109 connected to the standby line 104, line terminal equipment (LTE) 110 connected to the hot line 106, and a switch ("SC") control circuit 111.

The one-to-one line switching equipment 102 includes n units (not shown in FIG. 1) constructed by, for example, n relay contacts with distribute input signals transmitted through the n channels of input signal lines (IN) 112 to the line terminal equipment 103 or 105. The one-to-one, line switching equipment 10 provides status signals denoting whether the n switching units are connected to the hot output lines 117 or to the standby output lines 116 respectively, to the switch control circuit 107. When a fault occurs in the one-to-one line switching equipment 102 or the on one of the lines 117 the one-to-one line switching equipment 102 and the line terminal 105, the line terminal 105 sends an alarm signal to the switch control circuit 107. Based on the status signals and the alarm signal, the switch control circuit 107 sends switch commands to the one-to-one line switching equipment 102, and thus a switch from the hot side lines 117 to the standby side lines 116 is performed by the one-to-one line switching equipment 102. Similar switching is also performed by receiving part 101.

In operation, the input signals of n channels are input through the n input lines 112 to the one-to-one line switching equipment 102, in which the n channel signals are switched to the hot side or the standby side. The signals switched to the hot side are in the line terminal ("LTE") 105 connected to the hot line ("HC") 106. In the line terminal ("LTE") 105, the input signals are multiplexed by a control signal from the switch control circuit ("SC") 107 and are transmitted through the hot line ("HC") 106 to the line terminal ("LTE") 110 at the receiving part 101. The signals switched to the standby side are input to the line terminal ("LTE") 103 connected to the standby line ("ST") 104. In the line terminal ("LTE") 103, the input signals are multiplex by a control signal from the switch control circuit ("SC") 107 and are transmitted through the standby the ("ST") 104 to the line terminal ("LTE") 109 of the receiving part 101.

The control signal and the n channel signals are separated in the line terminal 110 at the receiving part 101, and the n channel signals then passed through the n switching units in the one-to-one line switching equipment 108 to be output therefrom to n channel output lines ("OUT") 113. The control signal is input through a control signal line 115 to the switch control circuit 111. Similarly, the control signal and the n channel signals are separated, in the line terminal 109 at the receiving part 101, and the n channel signals then passed through the n switching units in the one-to-one line switching equipment 108 to be output therefrom to n channel output lines 113. The control signal is input through the control signal line 115 to the switch control circuit 111.

When a fault occurs while a hot line is in use, the line terminal 105 or 110 which first detected the fault (here assumed to be 105) transmits an alarm signal to the switch control circuit 107, which then transmits a line switching instruction through a corresponding one of the n instruction lines 118 to the one-to-one line switching equipment 102, which is turned to the standby side, whereby the standby line is used instead of the hot line.

Simultaneously, a switching signal is transmitted from the switch control circuit 107 through the control signal line 114 and through the line terminals 105 and 110 to the switch control circuit 111, which changes the corresponding switching unit in the one-to-one line switching equipment 108 to the standby side.

As mentioned above, the switching functions of the one-to-on line switching eqipment 102 and 108 are divided and performed by a plurality of switching units; preferably, these switching units can be changed over when a fault occurs by removing them from a mother board even during use.

Figure 2:
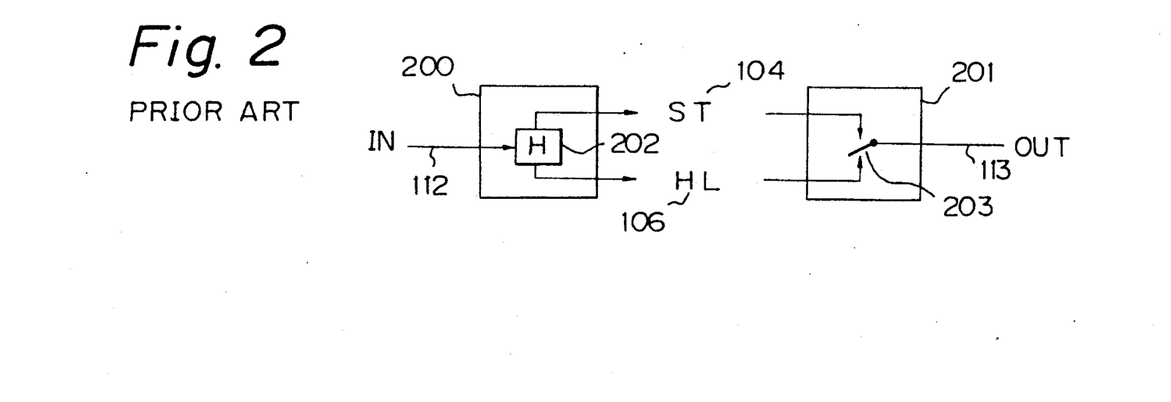
FIG. 2 is a block diagram illustrating conventional switching units for one channel in a one-to-one line switching system.

FIG. 2 is a block diagram of a conventional example of a main portion of the switching units in the one-to-one line switching equipment for one channel. In FIG. 2 and the following related description, the same reference numerals as those in FIG. 1 represent the same parts.

As shown in FIG. 2, the conventional unit 200 in the one-to-one line switching equipment 102 at the transmitting part 100 is constructed by, for example, a hybrid circuit 202, and the conventional unit 201 in the one-to-one line switching equipment 108 at the receiving part 101 is constructed by, for example, a relay contact 203. Each of the units 200 and 201 is formed on a PCB and is flexibly removable from a mother board when a change over is required. In place of the hybrid circuit 202, a relay contact used in the conventional art may be employed.

The hybrid circuit 202 does not perform the switching operation between the hot side and the standby side but only distributes the input signal selectively to the hot line and the stand by line. Note that the line terminal equipment 103, 105, 109, and 110 are omitted in FIG. 2, for simplicity.

When the relay contact 203 is switched or connected, to the hot side as shown in FIG. 2, the input signal is transferred through the hybrid circuit 202, the hot line 106, and the relay contact 203, to the output line 113.

When a fault occurs in the hot line side, the switch control circuit 111 at the receiving part 101 detects the fault and switches the relay contact 203 to the standby side (i.e., the upper side switch position in FIG. 2) and thus, the input signal is transferred through the standby line ("ST") 104 and relay contact 203 to the output line 113.

Since, however, the input signal line 112 for one channel corresponds to the single unit 200, and since the output signal line for one channel corresponds to the single unit 201, it is impossible to remove the unit 200 or 201 from the mother board for a change over when the channel is in use.

An object of the present invention is to provide a one-to-one line switching equipment in which a switching unit can be removed from the mother board for a change over even when in use.

Figure 3:
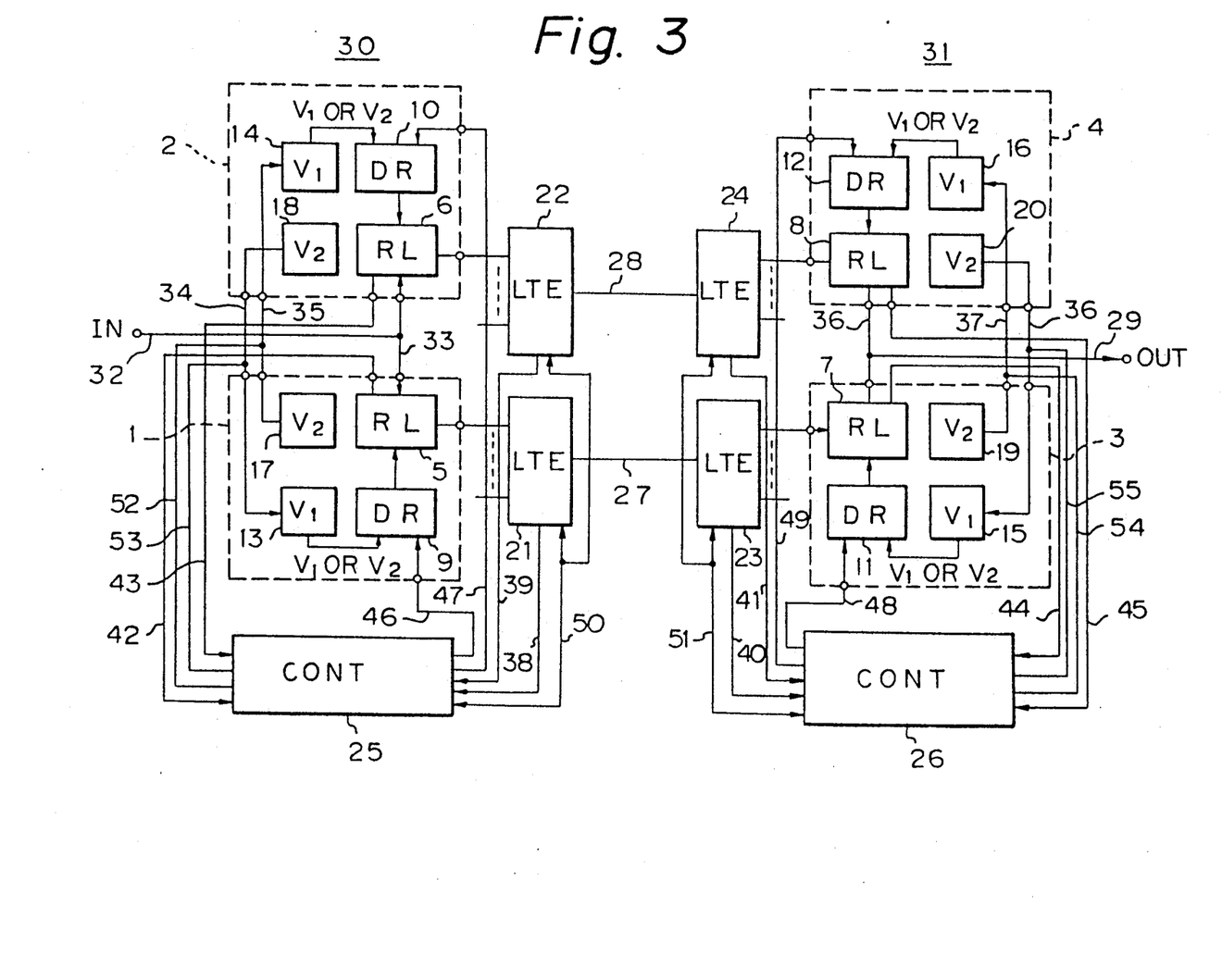
FIG. 3 is a principal block diagram illustrating switching units for one channel in a one-to-one line switching system according to an embodiment of the present invention.

FIG. 3 is a principal block diagram of a one-to-one line switching system according to an embodiment of the present invention.

As shown in FIG. 3, the one-to-one line switching system includes a transmitting part 30 formed on a mother board and a receiving part 31 formed on another mother board. The transmitting part 30 comprises a pair of switching units 1 and 2 for switching an input signal of one channel between a hot side and a standby side. The transmitting part 30 also comprises a switch control circuit 25. Both of the switching units 1 and 2 are flexibly removable from the mother board, and correspond to each other in a one-to-one correspondence and are controlled by a switch control circuit (CONT) 25. The switching units 1 and 2 have input ends for commonly receiving the input signal transmitted through an input signal line 32 when the switching units 1 and 2 are plugged in to the mother board.

The switching unit 1 has an output connected to a hot-side line terminal, or terminal equipment (LTE) 21, and the switching unit 2 has an output connected to a standby-side line terminal (LTE), or terminal equipment 22. The switching unit 1 includes a relay contact (RL) 5 having an input for receiving the input signal when it is plugged in. The output of the relay contact 5 is connected to the hot-side line terminal 21. Similarly, the switching unit 2 includes a relay contact (RL) 6 having an input for commonly receiving the input signal when it is plugged in. The output of the relay contact 6 is connected to the standby-side line terminal 22, i.e., the input ends of the switching relay contacts 5 and 6 are connected by a conductive line 33 to which the input signal line 32 is connected.

The switching unit 1 further includes a relay drive circuit (DR) 9, and two voltage sources ($V_1$ and $V_2$) 13 and 17. Similarly, the switching unit 2 further includes a relay drive circuit (DR) 10, and two voltage sources 14 and 18. The voltage source 13 in the switching unit 1 has an output end connected to the relay drive circuit 9 and an input end connected through a line 34 to the output end of the voltage source 18 in the switching unit 2 when both switching units 1 and 2 are plugged in. Similarly, the voltage source 14 in the switching unit 2 has an output end connected to the relay driving circuit 10 and an input end connected through a line 35 to the output end of the voltage source 17 in the switching unit 1 when both switching units 1 and 2 are plugged in. The voltage source 13 outputs a first voltage $V_1$ sufficient to operate the relay drive circuit 9 when the switching unit 2 is removed from the mother board and accordingly a second voltage $V_2$ from the voltage source 18 is not applied to the voltage source 13, and outputs a second voltage $V_2$ sufficient to inhibit the operation of the relay drive circuit 9. Similarly, the voltage source 14 outputs a first voltage $V_1$ sufficient to operate the relay drive circuit 10 when the switching unit 1 is removed from the mother board and accordingly a second voltage $V_2$ from the voltage source 17 is not applied to the voltage source 14, and outputs a second voltage $V_2$ sufficient to inhibit the operation of the relay drive circuit 10.

Similar to the transmitting part 30, the receiving part 31 comprises a pair of switching units 3 and 4 for transferring the signal received from a hot-side line terminal (LTE) 23 or the signal received from a standby-side line terminal (LTE) 24 to an output line 29. The receiving part 31 also comprises a switch control circuit ("CONT") 26. Both of the switching units 3 and 4 are flexibly removable from another mother board, and correspond to each other in a one-to-one correspondence and are controlled by the switch control circuit 26. The switching units 3 and 4 have output ends commonly connected to the output line 29 when they are plugged in to the mother board. The switching unit 3 has an input connected to the hot-side line terminal (LTE) 23, and the switching unit 4 has an connected to a standby-side line terminal (LTE) 24. The switching unit 3 includes a relay contact (RL) 7 having an input end for receiving the output signal from the line terminal 23 when the unit 3 is plugged in. The output, of the relay contact 7 is connected to the common connecting conductive line 36. Similarly, the switching unit 4 includes a relay contact 8 having an output connected to the common connecting conductive line 36 when the unit 4 is plugged in. The input of the relay contact 8 is connected to the output of the standby-side line terminal 24.

The switching unit 3 further includes a relay drive circuit (DR) 11, and two voltage sources ($V_1$ and $V_2$) 15 and 19. Similarly, the switching unit 4 further includes a relay drive circuit (DR) 12, and two voltage sources 16 and 20. The voltage source 15 in the switching unit 3 has an output end connected to the relay driving circuit 11 and an input end connected through a line 38 to the output end of the voltage source 20 in the switching unit 4 when both switching units 3 and 4 are plugged in. Similarly, the voltage source 16 in the switching unit 4 has an output end connected to the relay drive circuit 12 and an input end connected through a line 37 to the output end of the voltage source 19 in the switching unit 3 when both switching units 3 and 4 are plugged in. The voltage source 15 outputs a first voltage $V_1$ sufficient to operate the relay drive circuit 11 when the switching unit 4 is removed from the mother board and accordingly a second voltage $V_2$ from the voltage source 20 is not applied to the voltage source 15, and outputs a second voltage $V_2$ sufficient to inhibit the operation of the relay drive circuit 11 when the switching unit 4 is plugged in and accordingly the voltage $V_2$ from the voltage source 20 is applied to the voltage source 15. Similarly, the voltage source 16 outputs a first voltage $V_1$ sufficient to operate the relay drive circuit 12 when the switching unit 3 is removed from the mother board and according a voltage $V_2$ from the voltage source 19 not applied to the voltage source 16, and outputs a voltage $V_2$ sufficient to inhibit the operation of the relay drive circuit 12 when the switching unit 3 is plugged in and accordingly the voltage $V_2$ from the voltage source 19 is applied to the voltage source 16. The voltages $V_2$ from the voltage sources 17 and 18 are applied through lines 52 and 53 to the switch control circuit 25. Similarly, the voltage $V_2$ from the voltage sources 19 and 20 are applied through lines 54 and 55 to the switch control circuit 26.

When the switching unit 1 is removed from the mother board, the second voltage $V_2$ from the voltage source 17 is no longer supplied to the switch control circuit 25, and thus it recognizes the removal of the switching unit 1. Similarly, the switch control circuits 25 and 26 can recognize whether or not one or the other of the respectively associated switching units 1, 2 and 3, 4 are removed.

The line terminals 21, 22, 23, and 24 supervise the status of the switching units 1, 2, 3, and 4, respectively, and when a fault occurs in any one of the switching units, or when any one of the switching units is removed from its mother board, the corresponding line terminal generates an alarm signal which is sent through a corresponding line 38, 39, 40, or 41 to the corresponding switch control circuit 25 or 26. Status signals from the relay contacts 5 and 6, denoting whether the relay contacts are closed or open, are sent through lines 42 and 43 to the switch control circuit 25. Also, similar status signals from the switching relay contacts 7 and 8, are sent through lines 44 and 45 to the switch control circuit 26. In response to the alarm signal and the status signals, the corresponding switch control circuit 25 or 26 drives the relay drive circuit 9 10, 11, or 12 via, a line 46, 47, 48, or 49 to change the existing switching condition from a hot-line use to a standby use, or vise versa. Information of the change of the switching state is sent through a control signal line 50 or 51 and through the line terminal 21, 22, 23, or 24 to another switch control circuit. This switching operation caused by a fault, itself, is well known.

While the hot line 27 for example, is in use, it may be necessary to remove one of the switching unit 1, 2, 3, or 4 from the mother board, for replacement. When switching unit 1 is removed while the hot line 27 is in use, the voltage $V_2$ from the voltage source 17 is not supplied to the voltage source 14 in the switching unit 2, so that the voltage $V_1$ is output from the voltage source 14, and the switch drive circuit 10 is driven by the voltage $V_1$, although the switch control circuit 25 does not supply a control signal to the relay drive circuit 10 at the standby side. Therefore, the relay contact 6 is turned to pass the input signal from the input signal line 32 and the common connecting line 33 to the line terminal 22. The switch control circuit detects the change of the switching status in the relay contact 6 through the line 43, and generates a control signal representing the change of the switching status at the transmitting part 30. The control signal from the switch control circuit 25 is sent through the line terminal 21, the hot line 27, and the line terminal 23 to the switch control circuit 26 at the receiving part 31. The switch control circuit 26 then generates a control signal which is sent through the line 49 to the relay drive circuit 12. Also, in response to the control signal from the line 51, the switch control circuit 26 turns off the control signal sent to the hot-side relay drive circuit 11. Accordingly, the relay contact 7 is opened and the relay contact 8 is closed, and thus the input signal is transferred through the standby line 28 to the output line. The switch control circuit 25 then receives, through the lines 43 and 42, the status signals from the relay contacts 5 and 6, and in response to these status signals, the switch control circuit 25 generates a control signal which is sent through the line 46 to the relay drive circuit 9 and turns off the control signal to the relay contact, and thus the switching is completed.

While the hot line 27 is in use, when the switching unit 3 at the receiving part 31 is removed from the mother board, the switching operation from the hot-line use to the standby-line use is similar to the above described case, and therefore, a description thereof is omitted.

While the hot line 27 is in use, if the switching unit 2 or 4 is removed, no problem occurs because these units are not in use at this time. Namely, when the switching unit 2 or 4 for the standby line is removed while the hot line is in use, the relay drive circuit 9 or 11 in the switching unit 1 or 3 is still driven by the first voltage $V_1$, so that the hot line can be still used, and although the switch control circuit 25 or 26 acknowledges that the switching unit 2 or 4 has been removed, the switching signal is not transmitted to the other side, since it is for the standby line which is not in use.

While the standby line 28 is in use, if the switch unit 2 or 4 is removed, the switching from standby-line use to hot-line use is carried out in the same way as above, and accordingly, the switching units can be removed and changed over when in use.

In a summary of the above description with reference to FIG. 3, it is apparent that, according to the embodiment of the present invention, when, for example, the switching unit 1 is removed when the hot line is in use, the second voltage $V_2$ is no longer applied to the switching unit 2, and therefore, the switching unit 2 is driven by the first voltage $V_1$, causing the switching unit 2 to pass the input signal through the standby line. Also, because the second voltage $V_2$ is no longer applied from the voltage source 17 through the line 52 to the switch control circuit 25, the switch control circuit 25 acknowledges that the switching unit 1 for the hot line has been removed from the mother board, and thus a switching signal is transmitted through the control line to the switch control circuit 26 at the receiving part, whereby the switching from the hot-line use to the standby-line use is completed.

Figure 4:
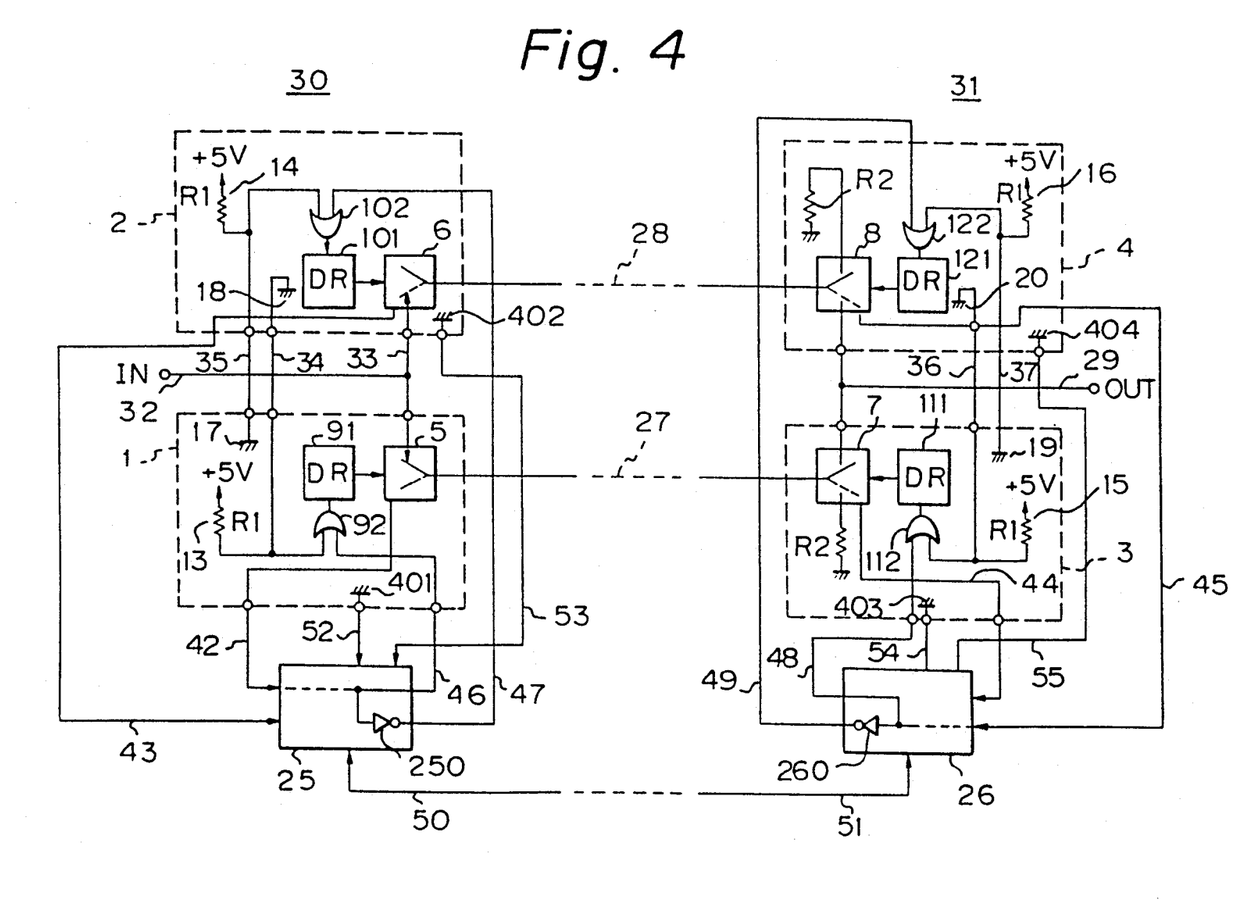
FIG. 4 is a circuit diagram illustrating a practical example of the switching units shown in FIG. 3, according to an embodiment of the present invention.

FIG. 4 is a more detailed block diagram of the one-to-one line switching system shown in FIG. 3, according to an embodiment of the present invention.

In FIG. 4, the same parts as those in FIG. 3, are denoted by the same reference numbers. The line terminals 21 to 24 in FIG. 3 are omitted in FIG. 4, for simplicity. Each of the voltage sources ($V_1$) 13, 14, 15, and 16 in FIG. 3 is implemented in FIG. 4 by a pulling up voltage of +5V and a resistor R1, and each of the voltage sources ($V_2$) 17, 18, 19, and 20 in FIG. 3 is implemented in FIG. 4 by an earth element connected to the ground of each unit. The earth element 17 in the switching unit 1, for example, is connected through the line 35 and the resistor R1 in the switching unit 2 to the pull up voltage of +5V when both units 1 and 2 are plugged in. The earth elements 18 to 20 in the other switching units 2, 3, and 4 have the same construction as the earth element 17.

At the transmitting part 30, the earth element 17 is also connected to an input of an OR circuit 102 when both switching units 1 and 2 are plugged in. The control signal, denoting whether or not the standby-side relay contact 6 should be closed, is sent from the switch control circuit 25 to another input of the OR circuit 102. The earth element 18 in the switching unit 2 is connected through the line 34 and the resistor R1 in the switching unit 1 to the pull up voltage of +5V when both units 1 and 2 are plugged in. Similarly, the earth element 18 is also connected to an input of an OR circuit 92 when both switching units 1 and 2 are plugged in.

The control signal denoting whether or not the hot-side relay contact 5 should be closed is sent from the switch control circuit 25 to another input of the OR circuit 92.

The receiving part has a similar construction, and therefore, a description thereof is omitted.

Note that reference numbers 401 to 404 are also earth elements. The switch control circuits 25 and 26 include inverters 250 and 260, so that the voltage levels on the lines 46 and 47, and on the lines 48 and 49, are opposite to each other.

In normal operation, the switch control circuit 25 provides a "1" level signal through the line 46 and the OR circuit 92 to the relay drive circuit 91, so that the relay contact 5 is closed and the input signal on the input line 32 passes through the relay contact 5 to the hot line 27, whereas the signal on the line 47 is "0" level and is applied to an input of the OR circuit 102 and the earth level, i.e., the "0" level of the switching unit 1, is applied through the line 35 to another input of the OR circuit 102, so that the relay drive circuit 101 is not driven and the relay contact 6 is open, and thus the input signal does not pass through the relay contact 6. At the receiving part 31, the switch control circuit 26 controls the relay drive circuits 111 and 121 so that the signal transmitted through the hot line 27 passes through the relay contact 7 in the switching unit 3 to the output line 29, and thus, the hot line 27 is used.

In the above mentioned normal state, when the switching unit 1 is removed from the mother board, the earth level from the earth element 17 in the switching unit 1 is not applied to the OR circuit 102, but instead, the pull up voltage of +5V in the switch unit 2 is applied through the OR circuit 102 to the relay drive circuit 101 whereby the relay contact 6 is switched, thereby to pass the input signal on the input signal line 32 to the standby line 28. On the other hand, the switch control circuit 25 recognizes the removal of the switching unit 1 by detecting the absence of the earth level on the line 52, and the switch control circuit 25 also detects the change of the status of the relay contact 6 through the line 43. In response thereto, the switch control circuit 25 transmits a control signal through the control lines 50 and 51 to the switch control circuit 26 at the receiving part 31, and in response to the control signal, the switch control circuit 26 then generates a "1" level signal which is supplied through the line 49 and the OR circuit 122 to the relay drive circuit 121, to switch the relay contact 8 to pass the signal from the standby line 28 to the output line 29. Simultaneously, the signal on the line 48 is made "0" level so that the relay contact 7 is opened, and thus even when the switching unit 1 is removed while the hot line 27 is in use, the communication can be continued by using the standby line 28. Therefore, the switching unit in which a fault has occurred can be removed and changed over while in use.

It will be apparent from the above description with reference to FIGS. 3 and 4 that the removal of the other switching unit is also possible while the hot line or the standby line is in use. Therefore, the description of the removal of the other switching unit is omitted. Note that, in the above description, the signal is transferred in one direction from the transmitting part 30 to the receiving part 31, for convenience of the explanation. In practice, however, the signal between the parts 30 and 31 may be bidirectional. Further, a plurality of pairs corresponding to a plurality of channels may be provided, each pair including the above mentioned hot-side switching unit and standby-side switching unit.

Figure 5:
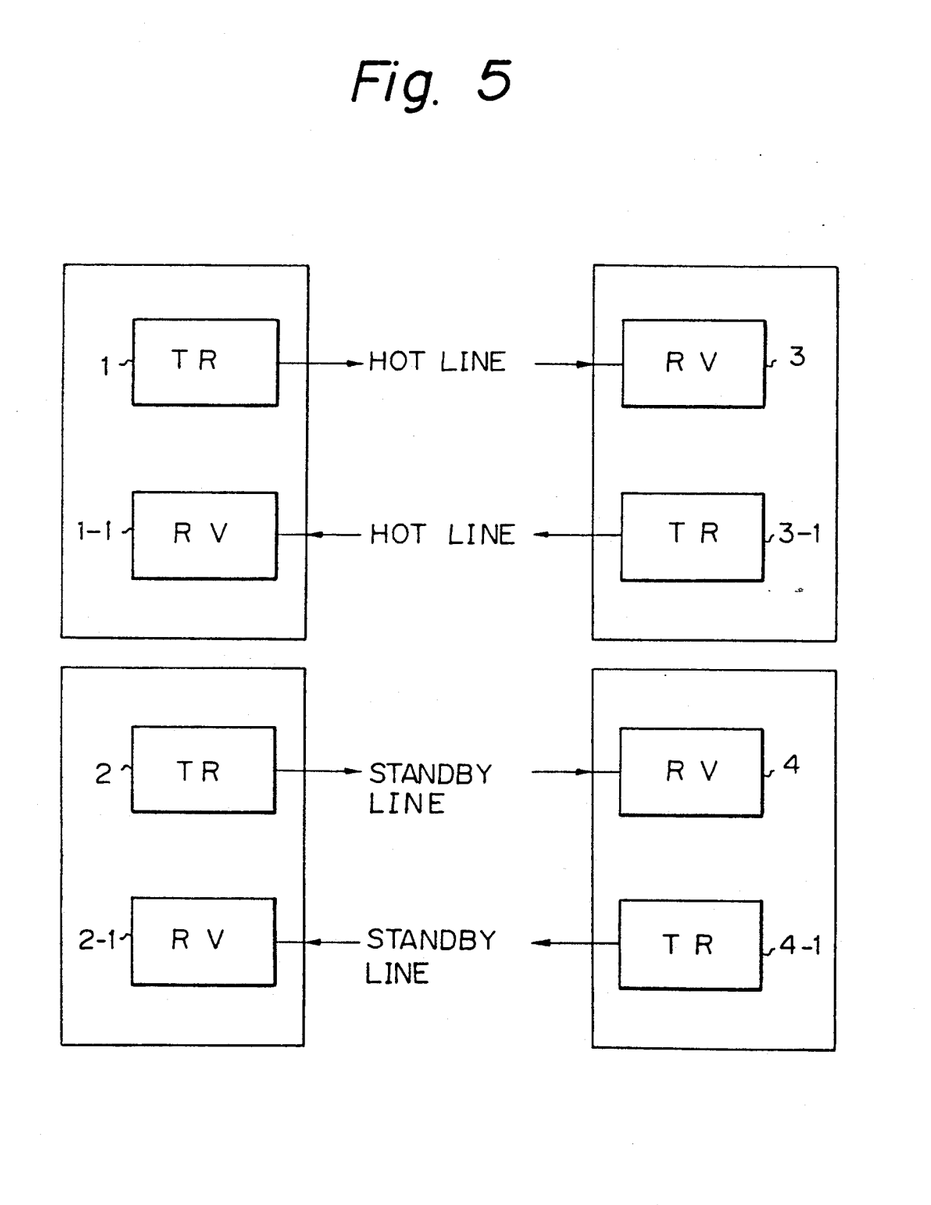
FIG. 5 is a block diagram illustrating switching units in a one-to-one line switching system according to another embodiment of the present invention.

Still further, as shown in FIG. 5, according to another embodiment of the present invention, each hot-side switching unit may include not only the switching unit 1 for transmission or the switching unit 3 for receiving as shown in FIG. 4, but also a switching unit 1-1 for receiving or a switching unit 3-1 for transmission, as shown in FIG. 5. Similarly, each standby side switching unit may include not only the switching unit 2 for transmission or the switching unit 4 for receiving but also a switching unit 2-1 for receiving or a switching unit 4-1 for transmission. In this case, the unit including the two switching units for transmission and for receiving is removable from the mother board.

Figure 6:
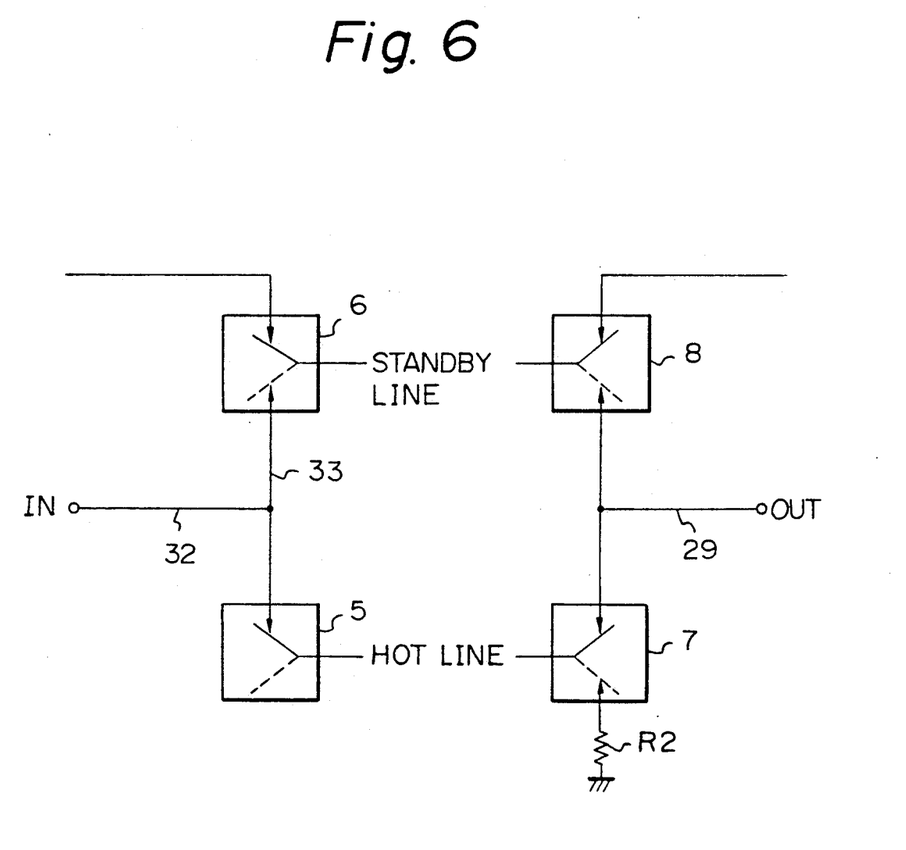
FIG. 6 block diagram illustrating switching units in a one-to-one line switching system according to still another embodiment of the present invention.

Also, as shown in FIG. 6, at the standby line side, an input signal having a priority lower than the priority of the normal input signal may be passed through the relay contact 6 and the relay contact 8 at the standby side when the system is in the hot-line use state, as shown in FIG. 4. The use of the signal having a lower priority enables the detection of a fault on the standby line.

As described above, according to the present invention, an effect is obtained whereby a switching unit can be removed and changed over even when in use.

What is claimed is:

1. A one-to-one line switching system including transmitting and receiving parts respectively formed on transmitting and receiving mother boards, the transmitting and receiving parts being interconnected by at least a hot line and a standby line and said transmitting part, in a busy mode, being supplied with and transmitting an input signal over a selected one of the hot and standby lines to the receiving part and comprising:

an input signal line;

a first pair of first and second switching units having a one-to-one correspondence with each other, and each being flexibly and selectively connectable to and removable from the transmitting part mother board, said first and second switching units, when connected to said transmitting part mother board, commonly receiving from said input signal line an input signal to be transmitted, one of said first and second switching units being selectively removable from said transmitting part mother board while the other thereof remains connected to said transmitting part mother board without interrupting transmission of the input signal by said transmitting part during said busy mode thereof;

each of said first and second switching units of said first pair thereof further comprising, in respective associated therewith;

first switching means having associated input means and output means, said respective input means of said first pair of first and second switching units being connected in common to said input signal line for commonly receiving an input signal thereon, when said respective first and second switching units are both connected to the transmitting part mother board, the respective output means of said first pair of said first and second switching units being connected respectively to said hot line and to said standby line, and the respective first switching means of said first pair of said first and second switching units being selectively operable for connecting the respectively associated input means to the respectively associated output means thereof and thereby supplying the input signal as commonly received by the respectively associated input means thereof to the respectively associated output means thereof and thereby, selectively, to the respectively corresponding hot and standby lines, and a first switching unit removed state detecting means, operatively connected to the other of said first and second switching units of said first pair thereof when both thereof are connected to transmitting part mother board, and operatively connected to and responsive to the first switching means of said other of said first and second switching units of said first pair thereof for detecting whether the other of said first and second switching units of said first pair thereof has been removed from said transmitting part mother board and, in response to such detection, for actuating said first switching means of said respectively associated one of said first and second switching units of said first pair thereof to connect the associated input means to the associated output means thereof for passing the input signal to the corresponding one of said hot and standby lines.

2. A one-to-one line switching system according to claim 1, wherein said transmitting part further comprises, in respective association with said first pair of first and second switching units thereof;

a first pair of first and second line terminal equipment units operatively connected to the output means associated with the respective said first switching means of said first and second switching units of said first pair thereof, for supervising the status of said respective first and second switching units; and first switch control means operatively connected to the first pair of first and second line terminal equipment units and to the respective, said first switching unit removed state detecting means of said first and second switching units of said first pair thereof, for selectively outputting the input signal, in accordance with and in response to the status of the respective first and second switching units of the first pair thereof, from the corresponding said first switching unit to the respectively associated and thereby selected one of the hot and standby lines, the first switching-unit removed state detecting means driving the first switching means in advance of the driving thereof by the first switch control means.

3. A one-to-one line switching system according to claim 2, wherein, in each of said first and second switching units of said first pair thereof, said first switching-unit removed state detecting means comprises:

first switch drive means, having an output operatively connected to a control terminal of said first switching means;

a first voltage source, having an output operatively connected to a control terminal of said switch drive means, for providing a first voltage sufficient to drive said switch drive means;

a second voltage source for providing a second voltage sufficient to inhibit the operation of said switch drive means of the other of said first and second switching units;

wherein, when both of said first pair of first and second switching units are connected to said transmitting part mother board, said second voltage source in one of said first and second switching unit sis connected to said first voltage source in the other of said first and second switching units, so that said second voltage is applied from said second voltage source in the other of said first and second switching units to said first switch drive means in said one of said first and second switching units for causing said first switching means in said one of said first and second switching units to transmit said input signal to the associated output means of said first switching means, and for causing said first switching means in the other of said first pair of switching units to be open; and when one of said first and second switching units of said first pair is removed from said transmitting part mother board, said second voltage source in said one of said first pair of first and second switching unit sis disconnected from said first switch drive means in the other of said first and second switching units so that, in said other of said first and second switching units, said first voltage is applied from said first voltage source to said first drive means, causing said first switching means to transmit said input signal to said associated output means thereof.

4. A one-to-one line switching system according to claim 1, wherein said receiving part comprises:

an output signal line;

a second pair of first and second switching units, each flexibly and selectively connectable to and removable from said receiving part mother board and corresponding to each other in a one-to-one correspondence, and having respectively associated input ends operatively connected to said hot line and to said standby line for receiving a signal selectively transmitted thereover by said transmitting part, respectively, and respectively associated output ends operatively and commonly connected to said output signal line when said second pair of first and second switching units are both connected to said receiving part mother board, and each of said second pair of first and second switching units further comprising:

a second switching means having associated input means and output means, said respective input means of said first and second switching means of said second pair being operatively connected to said hot line and said standby line, respectively, when said respective first and second switching units of said second pair of first and second switching units are both connected to said receiving part mother board, and said associated output means thereof being commonly connected to said output signal line; and a second switching-unit removed state detecting means, operatively connected to the other of said first and second switching units of said second pair thereof when both thereof are connected to said receiving part mother board, and operatively connected to and responsive to said second switching means of the other of said first and second switching units of said second pair thereof for detecting whether said other of said first and second switching units of said second pair thereof has been removed from said receiving part mother board and, in response to such detection, for actuating said second switching means of said respectively associated one of said first and second switching units of said second pair thereof to connect the associated input means to the associated output means thereof for passing the transmitted signal as correspondingly received thereby from said hot line or from said standby line to said output line.

5. A one-to-one line switching system according to claim 4, further comprising:
- a second pair of line terminals, operatively connected to the inputs of said second switching means in said second pair of switching units, for supervising the status thereof, respectively; and
- a second switch control means, operatively connected to said second pair of line terminals and to said second switching-unit removed state detecting means in said second pair of switching units, for selectively outputting said output signal from either of said second pair of switching units to said output line, in response to the status of said second pair of switching units;
- said second switching-unit removed state detecting means driving said second switching means prior to a drive thereof by said second switch control means.

6. A one-to-one line switching system according to claim 5, wherein said second switching-unit removed state detecting means in each of said second pair of first and second switching units comprises:
- second switch drive means, having an output operatively connected to a control terminal of said second switching means;
- a third voltage source, having an output operatively connected to a control terminal of said second switch drive means, for providing a third voltage sufficient to drive said second switch drive means in one of said second pair of first and second switching units; and
- a fourth voltage source for providing a fourth voltage sufficient to inhibit the operation of said second switch drive means in the other of said second pair of switching units;
- wherein when both of said second pair of first and second switching units are plugged in, said fourth voltage source in one of said second pair of switching units is connected to said third voltage source in the other of said second pair of switching units, so that said fourth voltage is applied from said fourth voltage source in the other of said second pair of switching units to said second drive means in one of said second pair of first and second switching units, causing said second switching means in one of said second pair of switching units to transmit said signal from said hot line or said standby line to said output line, and causing said second switching means in the other of said second pair of switching units to be open; and
- when one of said second pair of first and second switching unit sis removed from said receiving part mother board, said fourth voltage source in said removed one of said second pair of first and second switching units is disconnected from said second switch drive means in the other one of said second pair of first and second switching units so that, in said other one of said second pair of first and second switching units, said third voltage is applied from said third voltage source to said second drive means, causing said second switching means to transmit said signal from said respectively corresponding hot line or said standby line to the output line.

7. A one-to-one line switching system according to claim 6, wherein:
- said first switch control means comprises a switching signal transmitting means for transmitting a switching signal to said second switch control means when either of said first pair of first and second switching units is removed from said transmitting part mother board; and
- said second switch control means comprises a switching signal transmitting means for transmitting a switching signal to said first switch control means when either of said second pair of first and second switching units is removed from said receiving part mother board;
- said first switch control means driving a corresponding one of said first switch drive means when the switching signal received from said second switch control means indicates that either of said second pair of first and second switching units has been removed from said receiving part mother board, to drive the corresponding one of said first switching means; and
- said first switch control means driving a corresponding one of said first switch driving means when the switching signal received from said second switch control means indicates that either of said second pair of switching units has been removed from said second mother board, to drive the corresponding one of said second switching means.

8. A one-to-one line switching system according to claim 4, wherein said first voltage is a pull up voltage for driving said first switch drive means and said second voltage is the ground voltage for inhibiting the operation of said first switch drive means, and said third voltage is a pull up voltage for driving said second switch drive means and said fourth voltage is the ground voltage for inhibiting the operation of said second switch drive means.

9. A one-to-one line switching system according to claim 4, when said hot line is in use, a signal having a lower priority can be transmitted through said standby line.

10. A one-to-one line switching system including transmitting and receiving parts formed on respectively associated transmitting part and receiving part mother boards, the transmitting and receiving parts being interconnected by at least a hot line and a standby line and the transmitting part, in a busy mode, being supplied with and transmitting an input signal over a selected one of the hot and standby lines to the receiving part, the transmitting part comprising:
- an input signal line;
- a first pair of first and second switching units having a one-to-one correspondence with each other, and each being flexibly and selectively connectable to and removable from the transmitting part mother board, said first and second switching units, when connected to said transmitting part mother board, commonly receiving from said input signal line an output signal to be transmitted, one of said first and second switching units being selectively removable from said transmitting part mother board while the other thereof remains connected to said transmitting part mother board without interrupting transmission of the input signal by said transmitting part during said busy mode thereof;

each of said first and second switching units of said first pair thereof further comprising, in respective association therewith;

first switching means having associated input means and output means, said respective input means of said first pair of first and second switching units being connected in common to said input signal line for commonly receiving an input signal thereon, when said respective first and second switching units are both connected to the transmitting part mother board, the respective output means of said first pair of said first and second switching units being connected respectively to said hot line and to said standby line, and the respective first switching means of said first pair of said first and second switching units being selectively operable for connecting the respectively associated input means to the respectively associated output means thereof and thereby supplying the input signal as commonly received by the respectively associated input means thereof to the respectively associated output means thereof and thereby, selectively, to the respectively corresponding hot and standby lines, and a first switching unit removed state detecting means, operatively connected to the other of said first and second switching units of said first pair thereof when both thereof are connected to transmitting part mother board, and operatively connected to and responsive to the first switching means of said other of said first and second switching units of said first pair thereof for detecting whether the other of said first and second switching units of said first pair thereof has been removed from said transmitting part mother board and, in response to such detection, for actuating said first switching means of said respectively associated one of said first and second switching units of said first pair thereof to connect the associated input means to the associated output means thereof for passing the input signal to the corresponding one of said hot and standby lines; and said receiving part comprises:
an output signal line;

a second pair of first and second switching units, each flexibly and selectively connectable to and removable from said receiving part mother board and corresponding to each other in a one-to-one correspondence, and having respectively associated input ends operatively connected to said hot line and to said standby line for receiving a signal selectively transmitted thereover by said transmitting part, respectively, and respectively associated output ends operatively and commonly connected to said output signal line when said second pair of first and second switching units are both connected to said receiving part mother board, and each of said second pair of first and second switching units further comprising:

a second switching means having associated input means and output means, said respective input means of said first and second switching means of said second pair being operatively connected to said hot line and said standby line, respectively, when said respective first and second switching units of said second pair of first and second switching units are both connected to said receiving part mother board, and said associated output means thereof being commonly connected to said output signal line; and a second switching-unit removed state detecting means, operatively connected to the other of said first and second switching units of said second pair thereof when both thereof are connected to said receiving part mother board, and operatively connected to and responsive to said second switching means of the other of said first and second switching units of said second pair thereof for detecting whether said other of said first and second switching units of said second pair thereof has been removed from said receiving part mother board and, in response to such detection, for actuating said second switching means of said respectively associated one of said first and second switching units of said second pair thereof to connect the associated input means to the associated output means thereof for passing the transmitted signal as correspondingly received thereby from said hot line or from said standby line to said output line.

* * * * *

UNITED STATES PATENT AND TRADEMARK OFFICE
CERTIFICATE OF CORRECTION

PATENT NO. : 5,073,774
DATED : December 17, 1991
INVENTOR(S) : Fumihiro IKAWA

It is certified that error appears in the above-identified patent and that said Letters Patent is hereby corrected as shown below:

Col. 1, line 8, change "Filed" to --Field--.

Col. 2, line 5, after "under" delete --,--;
line 44, after "eration" insert --,--;
line 65, change "remove" to --removed--.

Col. 3, line 24, change "own" to --one--.

Col. 4, line 12, change "form" to --from--;
line 28, change "form" to --from--;
line 66, after "FIG. 6" insert --is a--.

Col. 5, line 25, delete "("SC")";
line 26, after "circuit" insert --("SC")--;
line 32, change "10" to --102--;
line 37, delete "the" (first occurrence), and after "117" insert --between--;
line 61, change "multiplex" to --multiplexed--;
line 63, change "standby the" to --standby line--.

Col. 8, line 15, after "has an" insert --input--;
line 53, change "according" to --accordingly--;
line 54, after "19" insert --is--.

Col. 9, line 19, after "via" delete ",".

Col. 11, line 57, start a new paragraph with the word "Note".

Col. 13, line 66, change "unit sis" to --units is--.

UNITED STATES PATENT AND TRADEMARK OFFICE
CERTIFICATE OF CORRECTION

PATENT NO.  : 5,073,774

DATED       : December 17, 1991

INVENTOR(S) : Fumihiro IKAWA

It is certified that error appears in the above-identified patent and that said Letters Patent is hereby corrected as shown below:

Col. 14, line 15, change "unit sis" to --units is--.

Col. 15, line 56, change "unit sis" to --units is--.

Col. 16, line 41, after "claim 4," insert --wherein,--.

Signed and Sealed this

Fourth Day of January, 1994

Attest:

BRUCE LEHMAN

Attesting Officer

Commissioner of Patents and Trademarks